(12) United States Patent
Jones et al.

(10) Patent No.: US 9,767,481 B2
(45) Date of Patent: Sep. 19, 2017

(54) SYSTEMS, METHODS, AND COMPUTER PROGRAMS FOR PROVIDING ADVERTISEMENTS IN A CONFERENCE USER INTERFACE

(71) Applicant: American Teleconferencing Services, Ltd., Atlanta, GA (US)

(72) Inventors: Boland T. Jones, Atlanta, GA (US); David Michael Guthrie, Norcross, GA (US); Mark A. Sjurseth, Smyrna, GA (US); John P. Keane, Marietta, GA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 116 days.

(21) Appl. No.: 13/802,984

(22) Filed: Mar. 14, 2013

(65) Prior Publication Data
US 2013/0297409 A1    Nov. 7, 2013

Related U.S. Application Data

(63) Continuation-in-part of application No. 12/789,993, filed on May 28, 2010, and a continuation-in-part of
(Continued)

(51) Int. Cl.
*G06Q 30/02* (2012.01)
*H04L 29/08* (2006.01)
(Continued)

(52) U.S. Cl.
CPC ..... *G06Q 30/0251* (2013.01); *H04L 12/1827* (2013.01); *H04L 65/403* (2013.01); *H04L 67/306* (2013.01); *H04L 67/36* (2013.01); *H04M 3/567* (2013.01); *H04M 3/562* (2013.01); *H04M 3/565* (2013.01); *H04M 7/0027* (2013.01); *H04M 2201/38* (2013.01);
(Continued)

(58) Field of Classification Search
None
See application file for complete search history.

(56) References Cited

U.S. PATENT DOCUMENTS

| 6,938,069 B1 * | 8/2005 | Narayanaswamy ... | G06Q 10/10 345/2.2 |
| 2002/0111898 A1 * | 8/2002 | Numaoka ............. | G06Q 20/10 705/37 |

(Continued)

*Primary Examiner* — Tuan S Nguyen
(74) *Attorney, Agent, or Firm* — Smith Tempel Blaha LLC

(57) ABSTRACT

Various embodiments of methods, systems, and computer programs are disclosed for providing advertisements in a conference user interface. One embodiment is a method comprising: a conferencing system establishing a conference between a plurality of participants via a corresponding computing device connected to the conferencing system via a communication network; presenting a conference user interface to the computing devices, the conference user interface displaying each of the participants as a unique participant object in a virtual location; an online advertising platform selecting advertisement data from one or more advertisers; providing the selected advertisement data to the conferencing system; and displaying the advertisement data with an associated advertisement object in the virtual location during the conference.

18 Claims, 11 Drawing Sheets

Related U.S. Application Data application No. 12/771,668, filed on Apr. 30, 2010, now Pat. No. 9,419,810.

(51) Int. Cl.
| | | |
|---|---|---|
| *H04L 12/18* | (2006.01) | |
| *H04L 29/06* | (2006.01) | |
| *H04M 3/56* | (2006.01) | |
| *H04M 7/00* | (2006.01) | |

(52) U.S. Cl.
CPC .... *H04M 2201/40* (2013.01); *H04M 2201/42* (2013.01); *H04M 2203/2038* (2013.01); *H04M 2203/655* (2013.01)

(56) References Cited

U.S. PATENT DOCUMENTS

| | | | |
|---|---|---|---|
| 2005/0137015 A1* | 6/2005 | Rogers et al. | 463/42 |
| 2007/0083434 A1* | 4/2007 | Fenti | G06Q 30/02 705/14.65 |
| 2008/0263460 A1* | 10/2008 | Altberg et al. | 715/757 |
| 2008/0281794 A1* | 11/2008 | Mathur | 707/3 |
| 2009/0033737 A1* | 2/2009 | Goose et al. | 348/14.07 |
| 2009/0265243 A1* | 10/2009 | Karassner et al. | 705/14.54 |

* cited by examiner

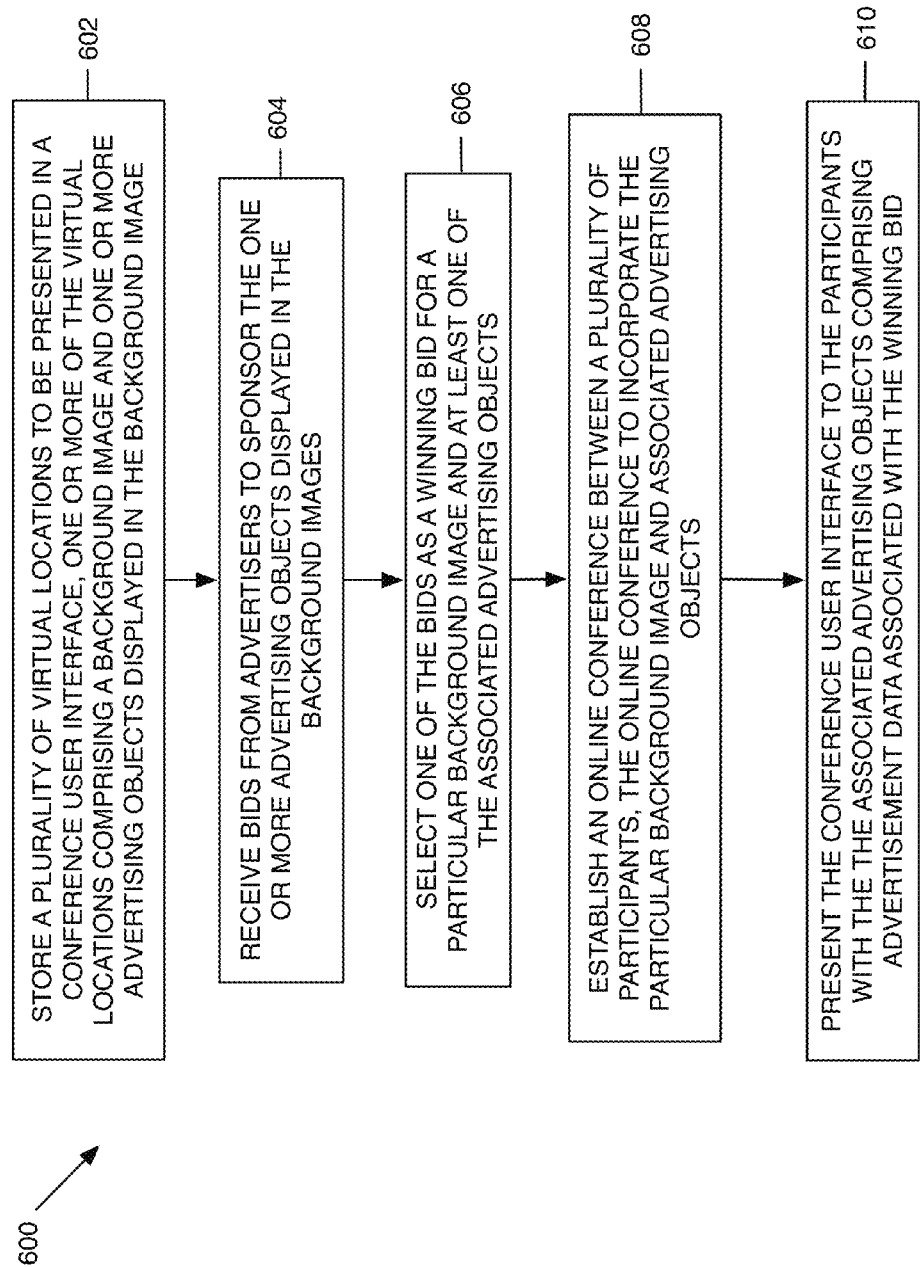

SYSTEMS, METHODS, AND COMPUTER PROGRAMS FOR PROVIDING ADVERTISEMENTS IN A CONFERENCE USER INTERFACE

CROSS-REFERENCE TO RELATED APPLICATIONS

This application is a continuation-in-part patent application of and claims the benefit of the priority of the following co-pending U.S. patent applications, each of which is hereby incorporated by reference in its entirety: U.S. patent application Ser. No. 12/789,993, filed on May 28, 2010, and entitled "Systems, Methods, and Computer Programs for Providing a Conference User Interface"; and U.S. patent application Ser. No. 12/771,668, filed on Apr. 30, 2010, and entitled "Location-Aware Conferencing With Graphical Representations That Enable Licensing and Advertising".

BACKGROUND

Currently, there are a number of conference solutions for enabling people to conduct live meetings, conferences, presentations, or other types of gatherings via the Internet, the public switched telephone network (PSTN), or other voice and/or data networks. Participants typically use a telephone, computer, or other communication device that connects to a conference system. The meetings include an audio component and a visual component, such as, a shared presentation, video, whiteboard, or other multimedia, text, graphics, etc. These types of convenient conference solutions have become an indispensable form of communication for many businesses and individuals.

Despite the many advantages and commercial success of existing conference, meeting, grouping or other types of gathering systems, there remains a need in the art for improved conference, meeting, grouping or other types of gathering systems, methods, and computer programs.

SUMMARY

Various embodiments of methods, systems, and computer programs are disclosed for providing advertisements in a conference user interface. One embodiment is a method comprising: a conferencing system establishing a conference between a plurality of participants via a corresponding computing device connected to the conferencing system via a communication network; presenting a conference user interface to the computing devices, the conference user interface displaying each of the participants as a unique participant object in a virtual location; an online advertising platform selecting advertisement data from one or more advertisers; providing the selected advertisement data to the conferencing system; and displaying the advertisement data with an associated advertisement object in the virtual location during the conference.

Another embodiment is a computer program embodied in a computer-readable medium for execution by a processor. The computer program comprises logic configured to: present a conference user interface to computing devices associated with one or more participants in a conference, the conference user interface displaying each of the participants as a unique participant object in a virtual location, the virtual location comprising one or more advertisement objects; select advertisement data from one or more advertisers; and display the advertisement data with an associated advertisement object in the virtual location during the conference.

Another embodiment is a computer system comprising a conferencing system and an advertising platform. The conferencing system establishes a conference between a plurality of participants accessing the conferencing system via a corresponding computing device. The conference comprises a conference user interface for displaying each of the participants as a unique participant object in a virtual location. The virtual location comprises one or more advertisement objects. The advertising platform is in communication with the conferencing system. The advertising platform is configured to select advertisement data from one or more advertisers to be displayed in association with the advertisement objects displayed in the virtual location during the conference.

BRIEF DESCRIPTION OF THE DRAWINGS

FIG. 6 is a flowchart illustrating an embodiment of a method for providing advertisements in the computer system of FIG. 1.

DETAILED DESCRIPTION

Various embodiments of systems, methods, and computer programs are disclosed for providing advertisements in a conference user interface. The conference user interface provides a visually engaging conference experience to participants of a conference via a computing device. The conference user interface may be used for conferences, meetings, groupings or other types gatherings (collectively, a "conference" with a system that provides the conference interface for a conference being referred to herein as a "conferencing system") for any variety of purposes of one or more people, groups or organizations (including combinations thereof and collectively referred to as "participants") with or without an audio component, including, without limitation, enabling simulcast audio with such conference for the participants. Exemplary embodiments of the conference, conference interface, conferencing system, and advertising features are described in the parent patent applications, U.S. patent application Ser. No. 12/789,993 and U.S. patent application Ser. No. 12/771,668, which are hereby incorporated by reference in their entirety. The systems, methods, and computer programs described below may be configured to incorporate one or more aspects of these embodiments.

Figure 1:
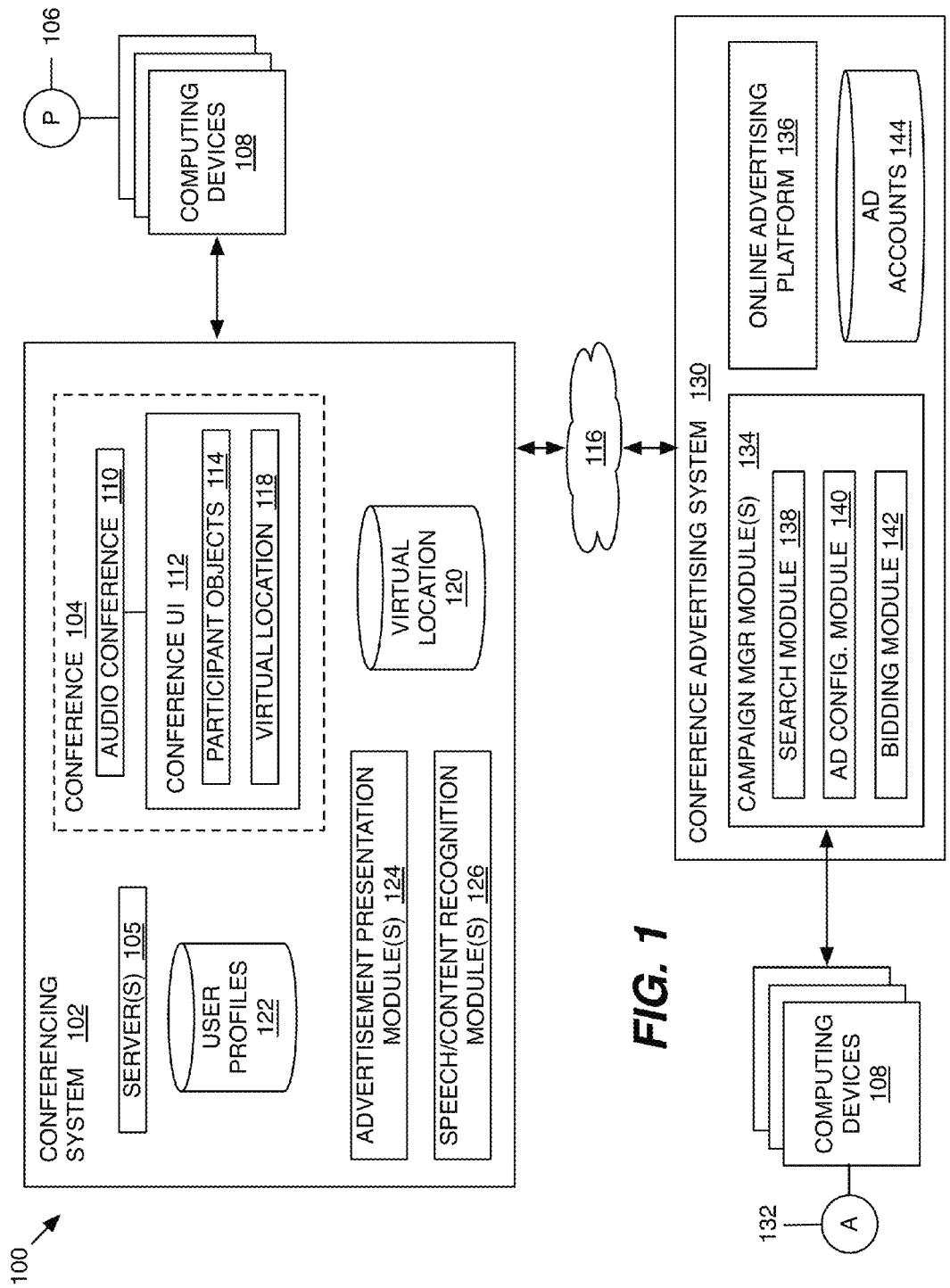
FIG. 1 is a block diagram illustrating an embodiment of a computer system for providing advertisements in a conference user interface presented by a conferencing system.

FIG. 1 illustrates a computer system 100 comprising a conferencing system 102 integrated with a conference advertising system 130. The computer system 100 comprises a plurality of client devices 108 in communication with a conferencing system 102 and server(s) 105 via one or more communication networks 116. The network(s) 116 may support wired and/or wireless communication via any suitable protocols, including, for example, the Internet, the Public Switched Telephone Network (PSTN), cellular or mobile network(s), local area network(s), wide area network(s), or any other suitable communication infrastructure. The computing devices 108 may be associated with participants 106 of a conference 104 provided by the conferencing system 102. The conference 104 includes an audio portion (e.g., audio conference 110) and an associated conference user interface 112 presented to the participant's computing devices 108 during the audio conference 104.

The computing devices 108 may comprise any desirable computing device, which is configured to communicate with the conferencing system 102 and the server 105 via the networks 116. The computing device 108 may comprise, for example, a personal computer, a desktop computer, a laptop computer, a mobile computing device, a portable computing device, a smart phone, a cellular telephone, a landline telephone, a soft phone, a web-enabled electronic book reader, a tablet computer, or any other computing device capable of communicating with the conferencing system 102 and/or the server 105 via one or more networks 116. The computing device 108 may include client software (e.g., a browser, plug-in, or other functionality) configured to facilitate communication with the conferencing system 102 and the server 105. It should be appreciated that the hardware, software, and any other performance specifications of the computing device 108 are not critical and may be configured according to the particular context in which the computing device 108 is to be used.

The conferencing system 102 comprises a communication platform for establishing an audio conference 110 between the computing devices 108. The conferencing system 102 may support audio via a voice network and/or a data network. In one of a number of possible embodiments, the conferencing system 102 may be configured to support, among other platforms, a Voice Over Internet Protocol (VoIP) conferencing platform such as described in U.S. patent application Ser. No. 11/637,291 entitled "VoIP Conferencing," filed on Dec. 12, 2006, which is hereby incorporated by reference in its entirety. It should be appreciated that the conferencing system 102 may support various alternative platforms, technologies, protocols, standards, features, etc. Regardless of the communication infrastructure, the conferencing system 102 may be configured to establish an audio connection with the participant computing devices 108, although in some embodiments the audio portion may be removed.

Figure 2:
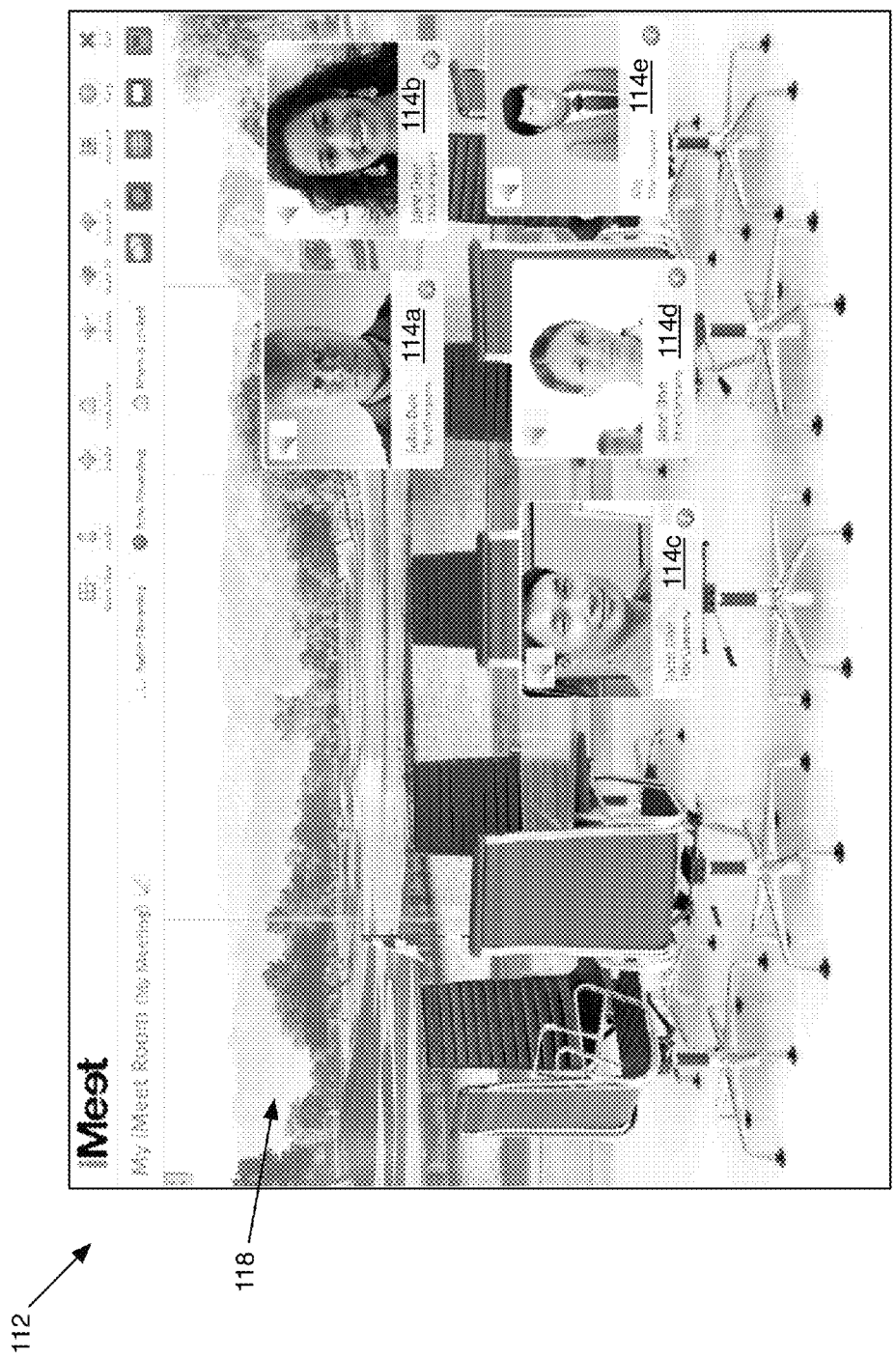
FIG. 2 is a screen shot illustrating an embodiment of the conference user interface of FIG. 1.

As illustrated schematically in FIG. 1, the conference user interface 112 comprises a virtual location 118 and participant objects 114. In this regard, the conference user interface 112 displays each of the participants 106 in the conference 104 as a unique participant object 114 in a virtual location 118. FIG. 2 illustrates an exemplary embodiment of a conference user interface 112 displaying participant objects 114a-114e in a virtual location 118.

In an embodiment, the virtual location 118 comprises a computer-simulated conference location that is presented to the computing devices 108. The virtual location 118 may be presented to the participants 106 via a graphical user interface. The virtual location 118 may store in an associated memory various forms of data for managing and presenting the computer-simulated conference locations. The virtual location 118 may comprise a graphical image of any desirable location. In the embodiment of FIG. 2, the virtual location 118 comprises a conference room with a window overlooking a golf course. The same virtual location 118 may be provided to each of the participants 106. In some embodiments, the participants 106 may customize a virtual location 118 or other aspects of the conference interface, in which case the system may present different virtual locations across the computing devices 102.

As further illustrated in FIG. 2, the conference user interface 112 may further comprise graphical representations of the participants 106 (e.g., participant objects 114), as well as user-related information associated with each participant 106. The participant objects 114 may comprise, for example, a 2-D graphic, a 3-D graphic, an avatar, an icon, an uploaded image, or any other suitable graphics, emblems, designs or other marks (each a "graphical representation") for uniquely or otherwise identifying the participants 106. The user-related information (e.g., name, address, email, telephone number, profile information, etc.) may be displayed in association with, or separately from, the graphical representations 128.

As further illustrated in the embodiment of FIG. 2, the conference user interface 112 may further comprise various user interface control(s) for enabling a participant to access any of the following, or other, features: a drop down menu for selecting and/or changing the virtual location 118, view, etc.; an invite control for inviting additional participants 106 to the audio conference 110; a lock room control for locking the current conference; an audio control for managing aspects of the audio conference 110 (e.g., recording the audio conference 110); a volume control; a mute/unmute control; and an account control for accessing and managing the participant's account with the conferencing system 102.

The conferencing system 102 may maintain a database of available virtual locations 118 (i.e., virtual location database 120). The virtual location database 120 may store a plurality of default images, as well as enable participants 106 to create and/or upload custom virtual locations 118. The virtual location database 120 may be leveraged to provide various advertising campaigns to advertisers 132 via a conference advertising system 130. For example, advertisers 132, content providers, affiliates, publishers, or other online participants may desire to provide product placement advertisements or other advertisements in the virtual location 118 to participants 106 during the conference. The server 105 and the conference advertising system 130 may combine to manage the presentation of advertisements in the conference user interface 112.

It should be appreciated that the database 120 may further support licensed assets, as described in the above-reference parent patent applications. For example, the virtual location 118 may be customized to resemble a distinctive setting, such as, a corporate boardroom, a host's office, or otherwise present licensed assets in the virtual location 118.

The conferencing advertisement system 130 may communicate with the conferencing system 102 or be integrated into the conferencing system 102. In an embodiment, the conference advertising system 130 may be provided by a third party service provider hosting a computer system that interfaces with the conferencing system 102 via, for example, an application programming interface (API) or other techniques, as known in the art. The conferencing advertising system 130 comprises campaign manager modules 134 for enabling advertisers 132 to create, edit, and manage advertising campaigns provided via an online advertising platform 136. A database 144 may store and manage user accounts for registered advertisers 132. In an embodiment, the campaign manager modules 134 comprise a search module 138, an advertisement configuration module 140, and a bidding module 142. The search module 138 comprises logic for enabling advertisers 132 to search, query, or otherwise access the virtual location database 120 via computing devices 108 to target specific customers, market segments, etc. The advertisement configuration module 140 comprises logic for enabling advertisers 132 to create, track, and manage advertisements by, for example, specifying advertisement data 320 (FIG. 3) to be displayed in association with one or more advertisement objects 312. The bidding module 142 comprises logic configured to enable advertisers 132 to bid on placement of their advertisement data 320 with advertisement objects 312. The online advertising platform 136 processes advertiser bids, selects winning bids, and provides the advertisement data 320 to the conferencing system 102 for presentation in association with the corresponding advertisement objects 312 during a conference 104. As illustrated in FIG. 1, the conferencing system 102 may comprise an advertisement presentation module 124 that interfaces with the online advertising platform 136 to receive and present the advertisement data 320 to the conference user interface 112.

It should be appreciated that the online advertising platform 136 and the bidding module 142 may be configured to support any desirable online advertising models, including, for example, a cost-per-click (CPC) model, a cost-per-action (CPA) model, a cost-per-view (CPV), a cost-per-impression (CPM) model, or any other model.

Figure 3:
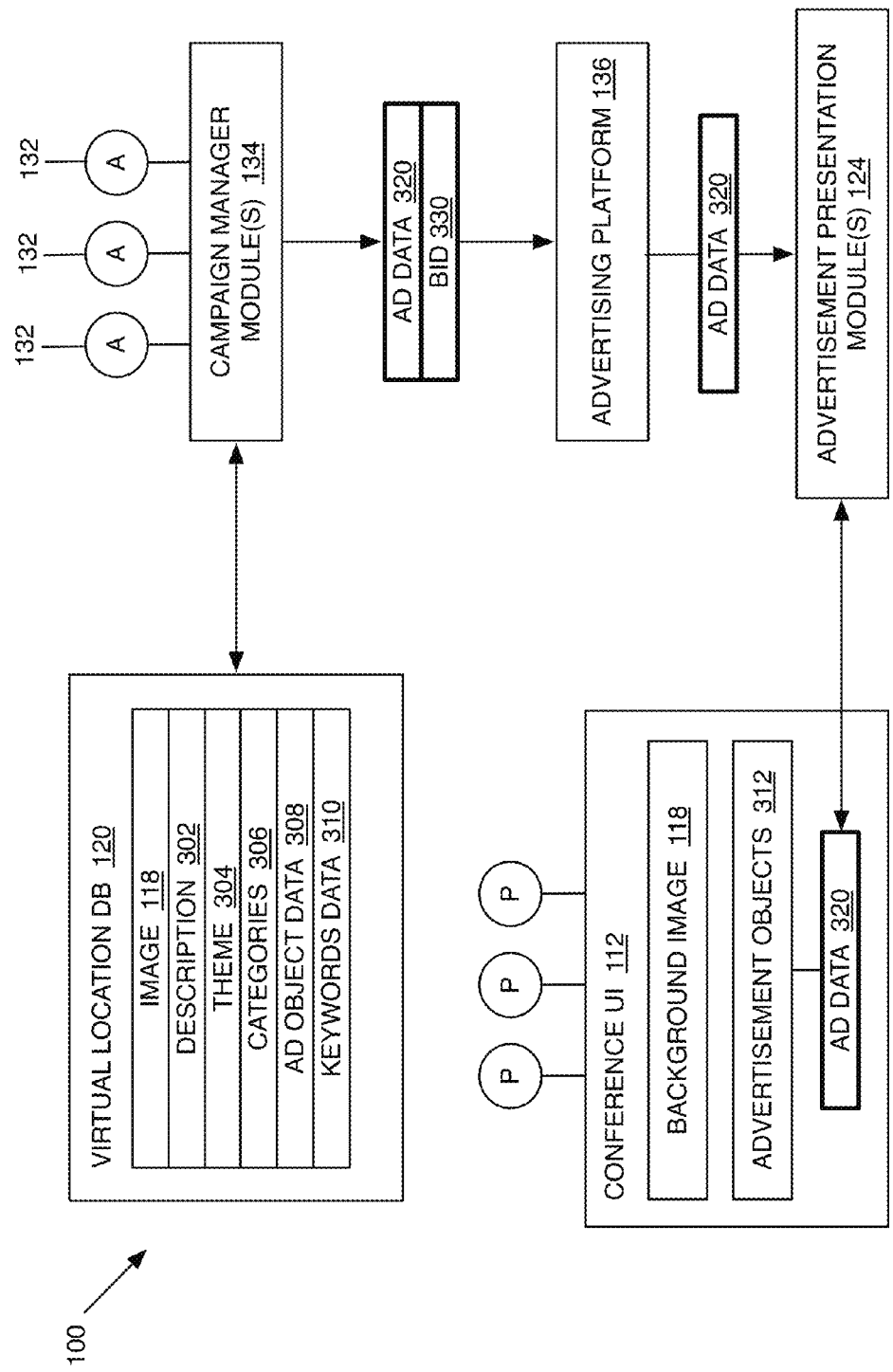
FIG. 3 is a combined block/flow diagram illustrating an embodiment of the architecture, operation, and/or functionality of the computer system of FIG. 1.

FIG. 3 illustrates the architecture, operation, and/or functionality of the various components in the computer system 100. The virtual location database 120 may comprise various types of data for enabling the advertisers 132 to customize advertising campaigns for the conference user interface 112. For example, in an embodiment, the virtual location database 120 may store a data structure for each virtual location 118 available for presentation via the conferencing system 102. The data may comprise a background image associated with the virtual location 118, a description 302, one or more themes 304, one or more product, service or other categories 306, data 308 associated with the advertisement objects 312 capable of being presented in the virtual location 118, and keywords data 310. Advertisers 132 may search this data via, for example, search module 138. In this manner, advertisers 132 may customize campaigns by targeting, for example, specific themes 304, categories 306, keywords 310, etc. It should be appreciated that participants 106 may be targeted according to demographic data, psychographic data, in-conference behavior, or other participant data stored in user profiles database 122.

Advertisers 132 may bid on the advertisement objects 312 based on any of the data stored in the virtual location database 120. The campaign manager modules 134 provide the advertisement data 320 and a corresponding bid 330 to the advertising platform 136. The advertising platform 136 processes the bids 330 from a plurality of advertisers 132 and selects a winning bid 330 according to the particular advertising model being employed. When a conference 104 has been established or prior to a scheduled conference 104, the conferencing system 102 may send a request to the advertising platform 136 for the advertisement data 320 to be displayed with the advertisement objects 312 for the corresponding virtual location 118. In response to the request, the advertising platform 136 provides the advertisement data 320 for the winning bid(s) 330 to the advertisement presentation module(s) 124. The advertisement presentation module 124 may configure the advertisement objects 312 by, for example, combining the advertisement data 320 with a data object stored in the virtual location database 120. In other embodiments, the advertisement data 320 may comprise objects that have been pre-configured for presentation in the conference user interface 112 without any processing by the conferencing system 102.

Figure 4:
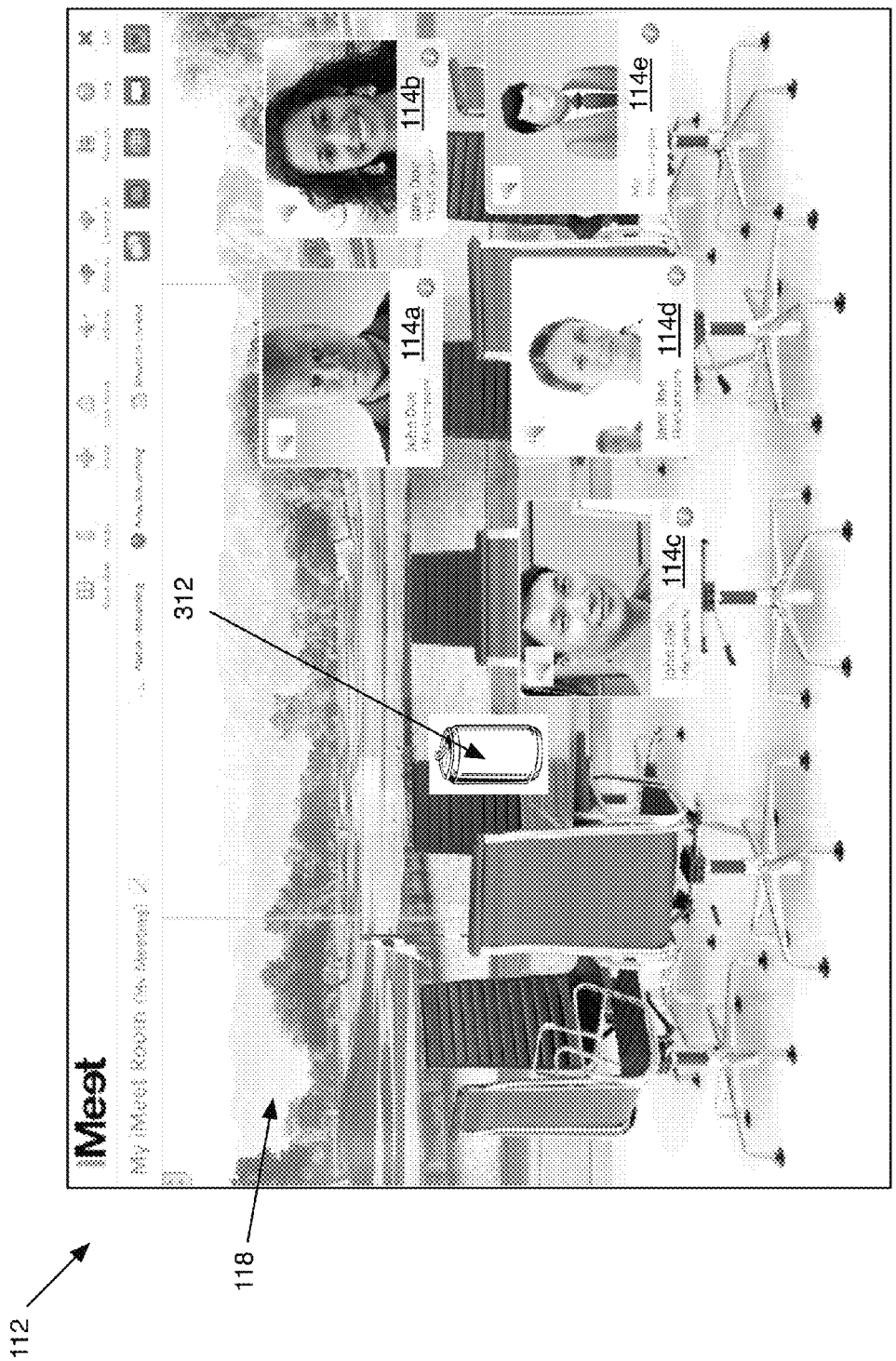
FIG. 4 is a screen shot of the conference user interface of FIG. 2 illustrating an exemplary advertisement object displayed in the virtual location.
Figure 5A:
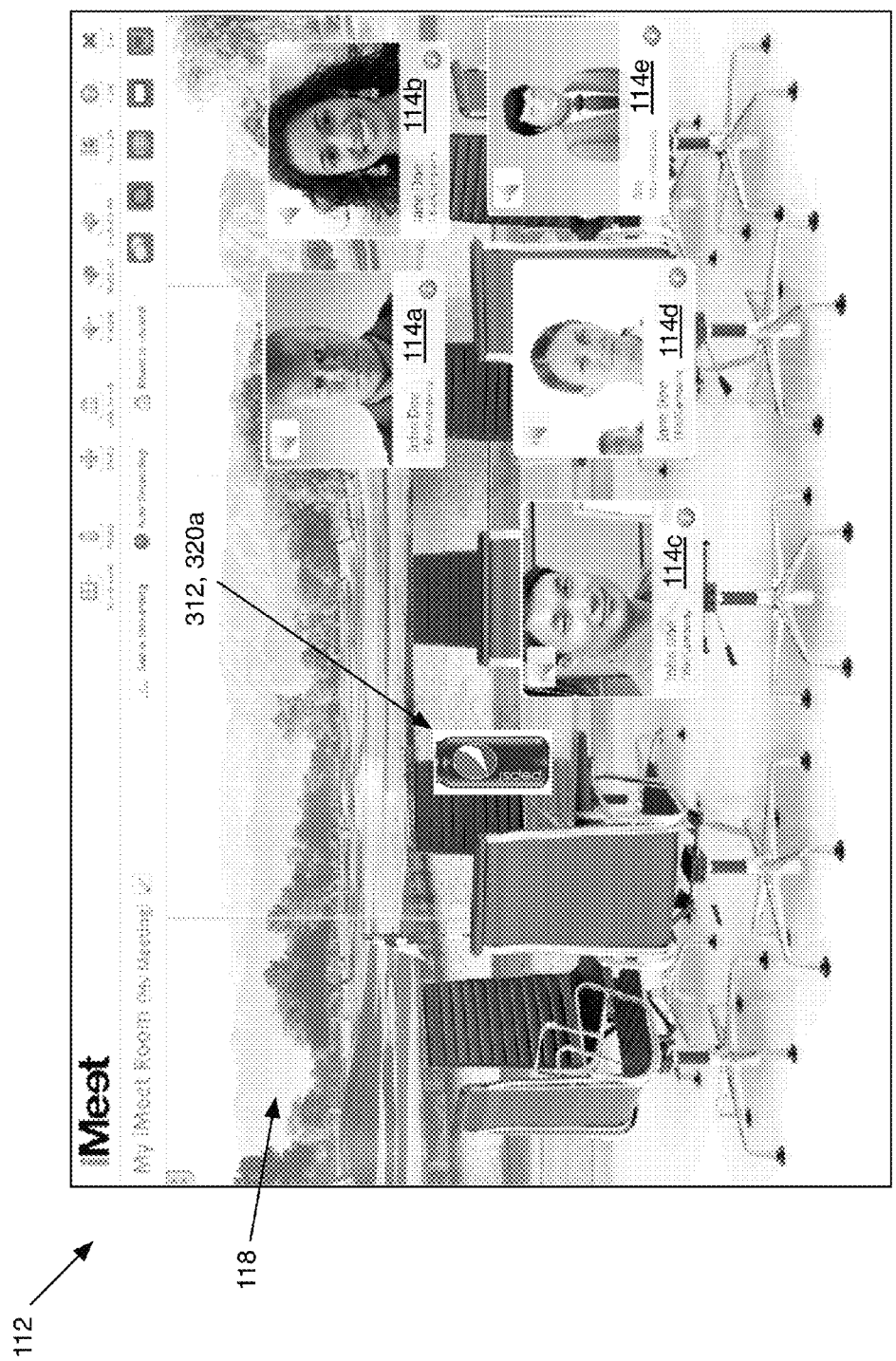
FIG. 5a illustrates the conferencing user interface of FIG. 4 with the exemplary advertisement object displayed with advertisement data from a first advertiser.
Figure 5B:
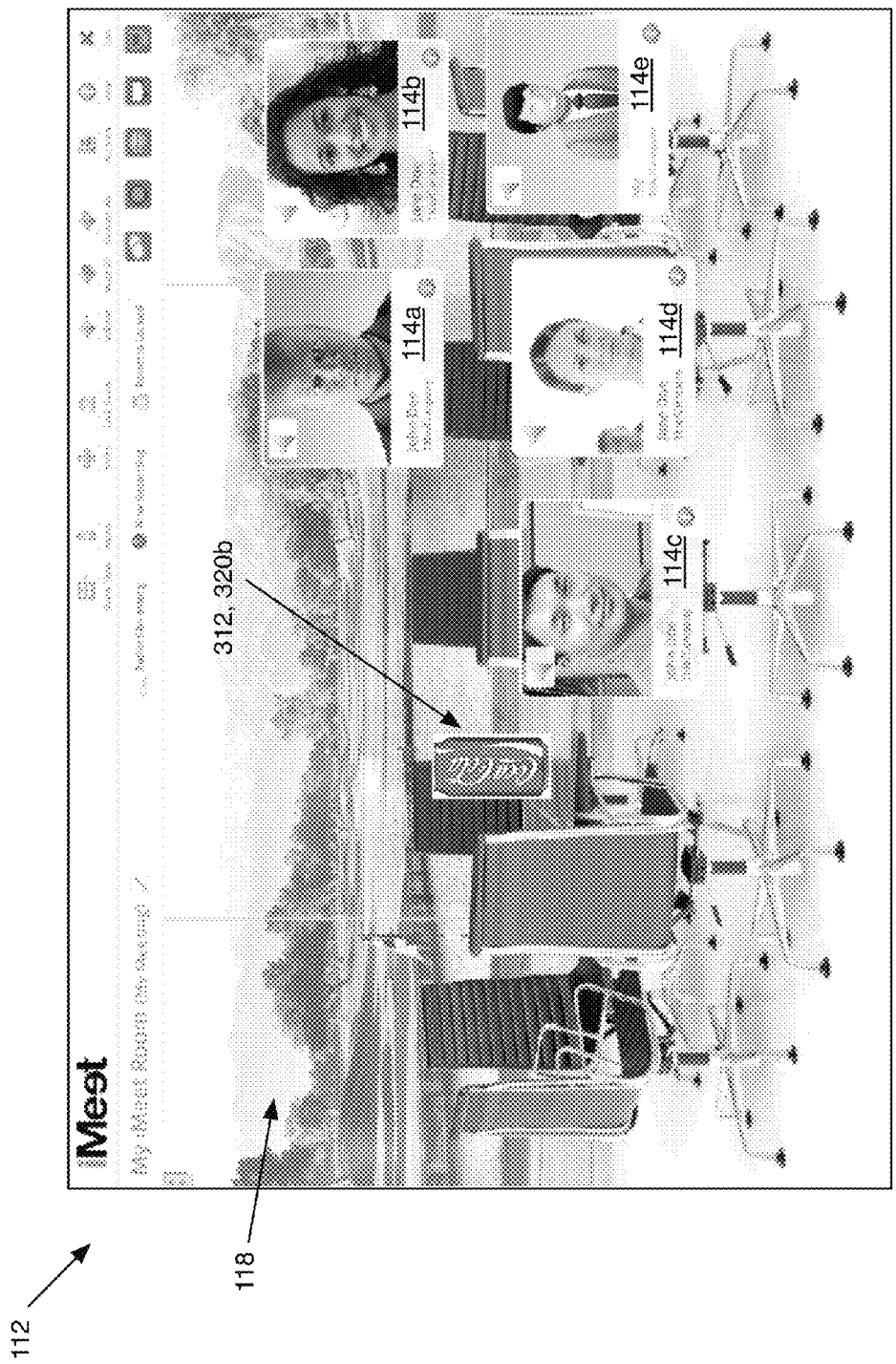
FIG. 5b illustrates the conferencing user interface of FIG. 4 with the exemplary advertisement object displayed with advertisement data from a second advertiser.

FIG. 4 illustrates an embodiment of an advertisement object 312 displayed in the conference user interface 112. The advertisement object 312 in FIG. 4 comprises an unbranded or unsponsored graphical object of a beverage can without any advertisement data 320. The conferencing system 102 may or may not display unbranded advertisement objects 312. In an embodiment, if the online advertising platform 136 does not provide any data for available advertisement opportunities, the conferencing system 102 may display the unbranded object with an indication that this object is available for sponsorship. If the unbranded object is selected by, for example, a host and/or a participant, the conferencing system 102 may display information or details about sponsoring that particular object with links to the online advertising platform 136. Where advertisement data 320 has been provided by the online advertising platform 136, the conference user interface 112 may display the advertisement object 312 with the corresponding advertisement data 320. FIG. 5a illustrates an example in which the can has been branded with advertisement data 320a for a first beverage company.

The sponsorship of an advertisement object 312 may include a predefined duration of the scheduled conference 104. For instance, the first beverage company may have bid for a first portion of the conference 104 while a second beverage company bids for a second portion. FIG. 5a illustrates an embodiment in which the advertisement object 312 is rebranded during the conference 104 with advertisement data 320b for the second beverage company. In this regard, the conferencing system 102 may insert and remove the advertisement objects 312 according to predefined schedules or other parameters as desired.

It should be further appreciated that the integrated advertising/conferencing platform may support various types of advertisements, sponsorships, etc. The advertisement data 320 may comprise images of products or services, videos, moving graphics, audio, text advertisements, sponsorship details, etc. (collectively referred to as "advertisement data" without regard to a specific business model or type of media).

The integrated advertising/conferencing platform may also manage licensed assets as described in the above-referenced parent patent application, U.S. patent application Ser. No. 12/771,668. In this manner, the advertising platform may be advantageously combined with a licensing program that licenses assets from third parties and offers them for use in a virtual location 118 and/or purchase by participants 106. A licensed asset may comprise a licensed location for the virtual location 118, or graphics, audio, video, items, etc. that may be licensed from third parties and presented in the conference user interface 112. As an example, a licensed asset may include displaying a particular celebrity as a participant 106, displaying artwork (e.g., wall paintings, sculptures, etc.) in the virtual location 118. Although not necessary to be considered licensed assets, it should be appreciated that the licensed assets may comprise any embodiment of intellectual property rights in any medium that are capable of being presented in the virtual conference location 118.

FIG. 6 illustrates an embodiment of a method 600 for providing advertisements in the computer system 100. At block 602, a plurality of virtual locations 118 are stored in a database 120. The virtual locations 118 may comprise background image(s), graphics, etc. and one or more accompanying advertising objects 312 that may be displayed. At block 604, the online advertising platform 136 receives bids 330 from one or more advertisers 132 or sponsors who wish to sponsor or advertise via the advertising objects 312. The bids 330 and accompanying advertisement data 320 may be provided by the advertisers 132 or sponsors via the campaign manager modules 134 (FIG. 1). At block 606, the online advertising platform 136 selects one of the bids 330 as a winning bid for a particular virtual location 118 and/or advertisement object 312. The winning bid 330 may be determined using any desirable online advertising model, as described above. At block 608, a conferencing system 102 establishes a conference 104 between a plurality of participants 108. The conference 104 is configured to present the virtual location 118 with the associated advertisement objects 312. At block 610, the conferencing system 102 presents the conference user interface 112 to the participants 108 with the advertisement data 320 associated with the winning bid.

Figure 7:
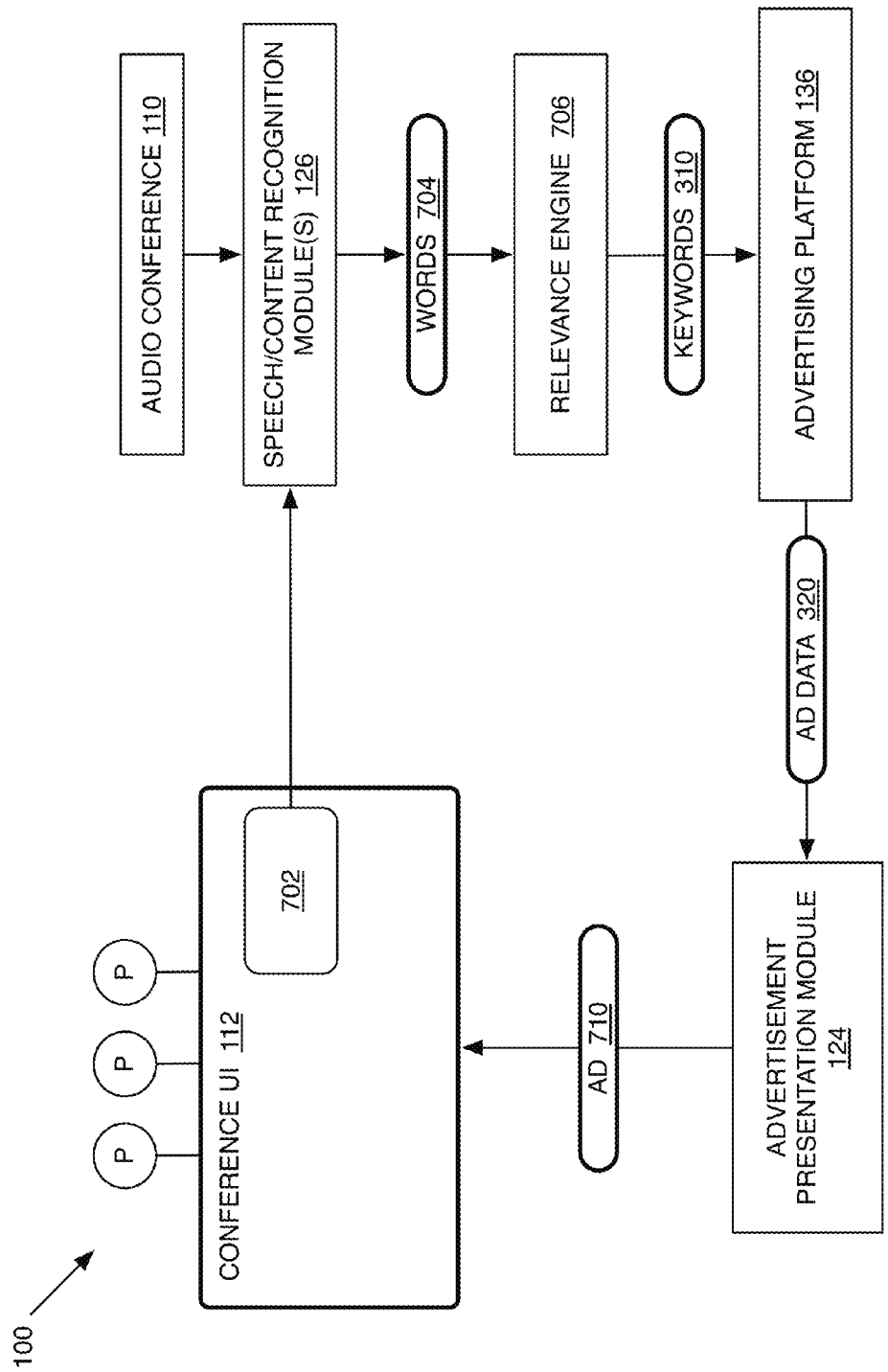
FIG. 7 is a combined block/flow diagram illustrating another embodiment of the architecture, operation, and/or functionality of the computer system of FIG. 1.

As mentioned above, the advertisements may be selected and presented in the conference user interface 112 at anytime during the conference 104. Referring to FIG. 7, in another embodiment, the advertisements may be selected during the conference 104 in response to words spoken by participants 108 during the audio conference 110 or content displayed in the conference user interface 112. The conferencing system 102 may comprise speech/content recognition module(s) 126 for monitoring spoken words in the audio conference 110 or other content (e.g., text, documents, audio, videos, etc.) presented in the conference user interface 112 via, for example, a conferencing application 702. The speech/content recognition module(s) 126 may employ speech-to-text algorithms or other algorithms to identify words 704 associated with the conference 104. The words 704 may be provided to a relevance engine 706 for processing and identification of relevant keywords 310. For example, the speech/content recognition module(s) 126 may determine when a participant 106 speaks about making airline reservations or the like. The relevance engine 706 receives the words 704 and determines that they may be relevant to keywords 310 (e.g., airlines) associated with available advertisement objects 312. The keywords 310 may be provided to the advertising platform 136, which finds matching advertisement data 320 for airlines. The advertisement data 320 is provided to the advertisement presentation module 124 and an associated advertisement 710 may be presented, in real-time or near real-time, to the conference user interface 112.

Figure 8:
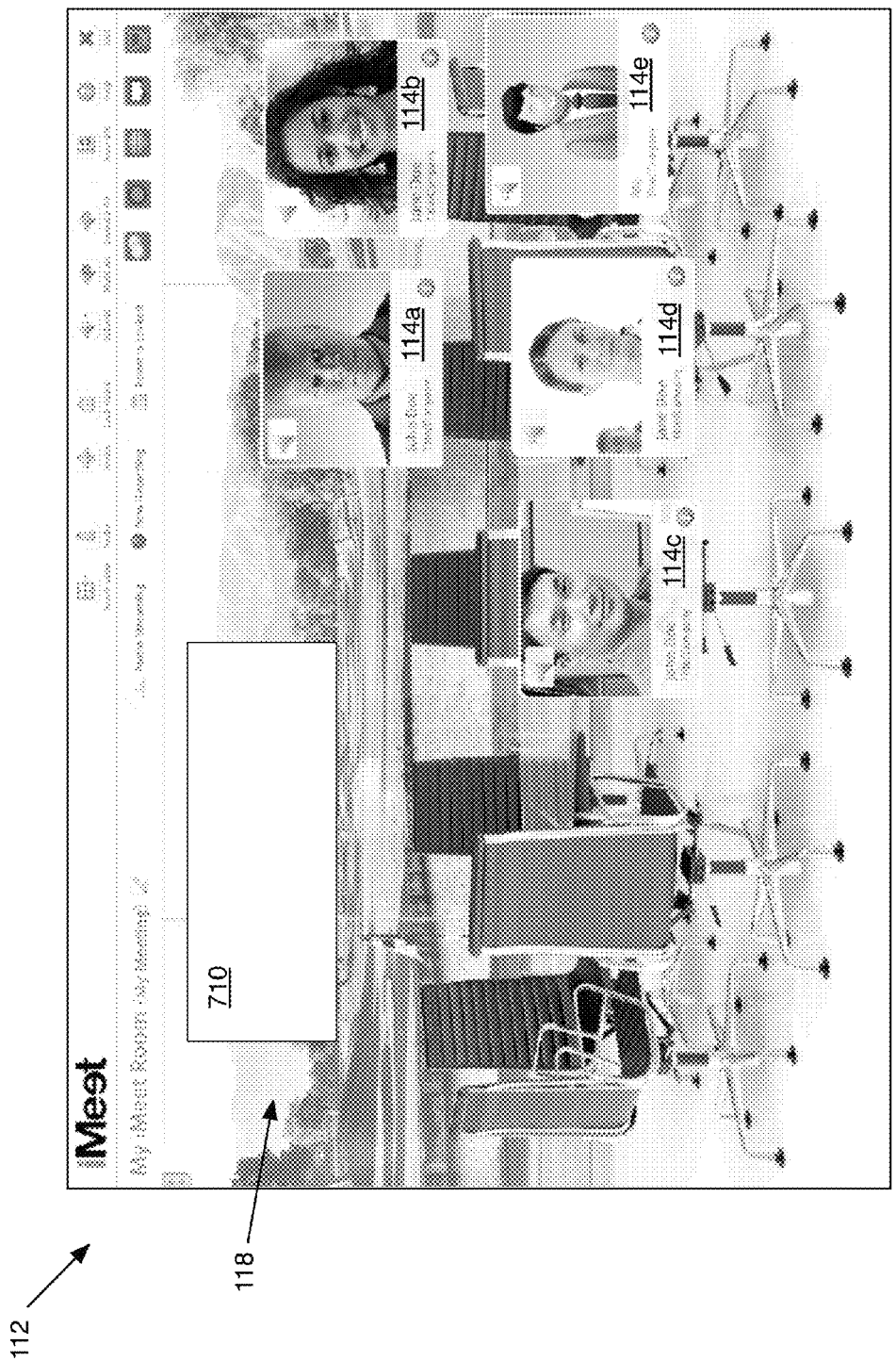
FIG. 8 is a screen shot of the conference user interface of FIG. 2 illustrating an embodiment of a displayed advertisement comprising a display ad.
Figure 9:
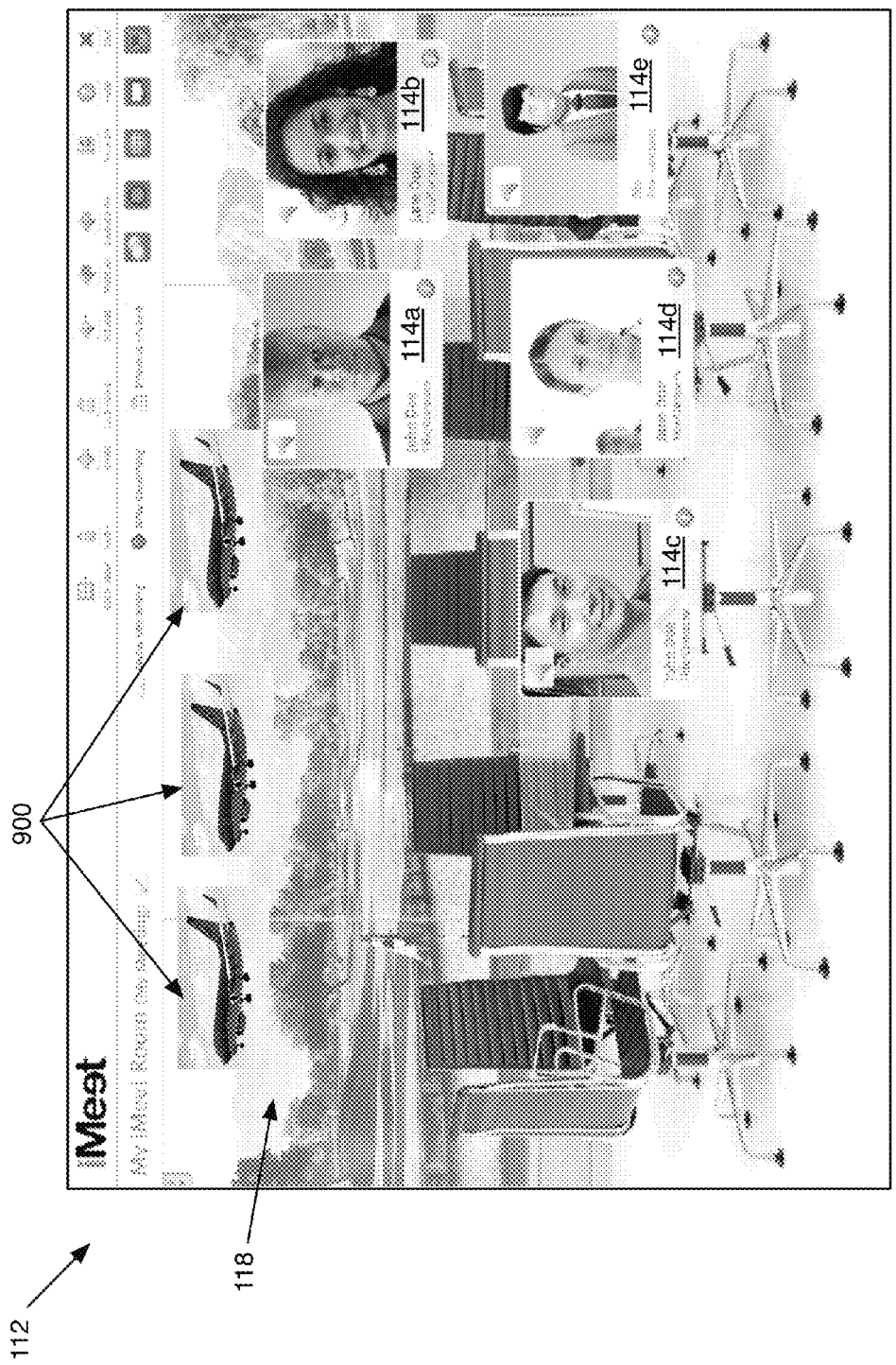
FIG. 9 is a screen shot of the conference user interface of FIG. 2 illustrating another embodiment of a displayed advertisement comprising a moving image.
Figure 10:
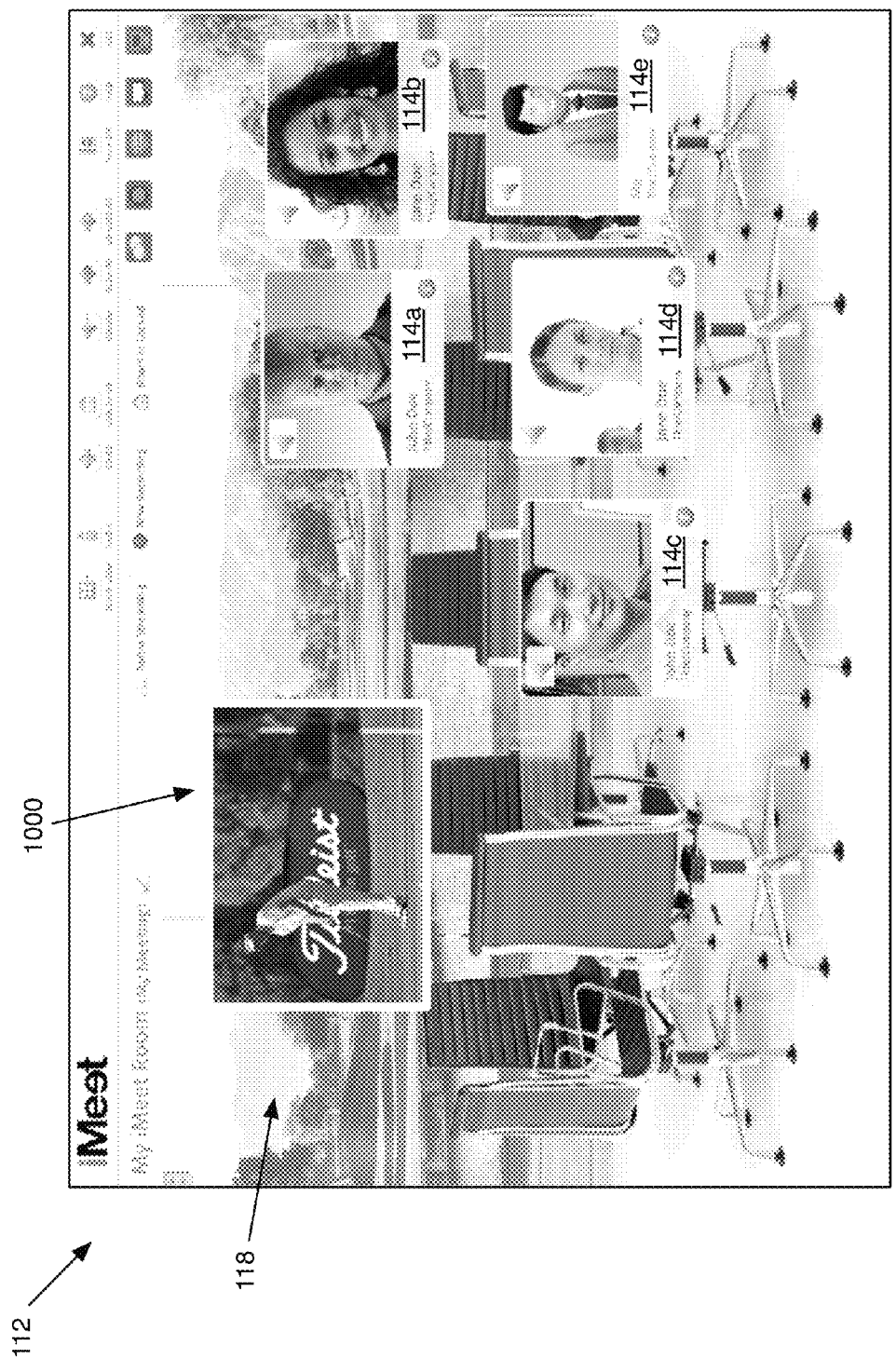
FIG. 10 is a screen shot of the conference user interface of FIG. 2 illustrating another embodiment of a displayed advertisement comprising a zoomed portion of the virtual location with a product placement.

As illustrated in FIG. 7, the advertisement 710 may be presented in a pop-up display with the advertisement data 320 or other sponsorship or advertisement information. In FIG. 8, the advertisement 710 may comprise a moving image 900 of a branded airplane moving across the background image of the sky above the golf course. FIG. 9 illustrates another example in which one of the participants 106 speaks words 704 related to golf. The relevance engine 706 identifies a keyword 310 (e.g., golf, golf clubs, golf balls, golf manufacturers, etc.) and provides the keyword 310 to the online advertising platform 136. The keyword 310 may be used to identify a winning bid associated with a golf manufacturer (e.g., Titleist). In response, the conferencing system 102 may insert the advertisement 710 associated with Titleist in the virtual location 118. In the embodiment illustrated in FIG. 10, the advertisement 710 is configured as a product placement advertisement 1000 that is designed to incorporate the visual graphics of the virtual location 118. For example, the background image of the golf course may be seamlessly modified to provide a product placement advertisement 1000 showing a golfer interacting with the virtual location 118 and with an advertisement 710 identifying the Titleist®. It should be appreciated that the product placement advertisement 1000 may be displayed without regard to the speech/content recognition. Rather, the keyword 310 for "golf" may be included in the virtual location database 120.

The speech/content recognition module(s) 12126 may be configured in the manner described in the above-referenced parent patent application, U.S. patent application Ser. No. 12/789,993. The conferencing system 102 may support a real-time speech-to-text functionality that may automatically convert speech from the audio conference 110 into text. The output text may be processed by the relevance engine 707 to identify keywords, topics, themes, or other subject matter being discussed during the audio conference 110. The keywords may be used as input to a search engine, knowledge base, database, etc. for the purpose of identifying advertisements related to the keywords, which may be presented, in real-time, to the participants 108 during the audio conference 110

It should be appreciated that one or more of the process or method descriptions associated with the flow charts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the conferencing system 102, computing devices 108, and/or the conference advertising system. Furthermore, the logical functions may be embodied in any computer readable medium for use by or in connection with an instruction execution system, apparatus, or device, such as a computer-based system, processor-containing system, or other system associated with the multi-platform virtual conference location system that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A computer system comprising
a conferencing system comprising a first processor for establishing a conference between a plurality of participants accessing the conferencing system via a corresponding computing device and for enabling the participants to view during the conference a conference user interface for displaying each of the participants as a unique participant object in one of a plurality of selectable virtual locations stored in a virtual location database, each of the selectable virtual locations specified by a different participant in the conference and comprising a corresponding background image with one or more displayed objects and one or more advertisement objects comprising an unbranded graphical object, the conference user interface comprising a conferencing application for sharing content;
a speech/content recognition module and relevance engine in communication with the conferencing system and configured to determine keywords in response to words spoken by the participants or the shared content presented in the conferencing application; and
an advertising platform in communication with the conferencing system, the advertising platform comprising a second processor configured to select advertisement data from one or more advertisers to be displayed in association with the advertisement objects displayed in the corresponding virtual locations during the conference based on the keywords determined in response to the spoken words or the shared content presented in the conferencing application, the second processor further configured to provide the selected advertisement data to the conferencing system;
wherein the first processor of the conferencing system receives the selected advertisement data from the advertising platform and, in response, automatically modifies without user input the unbranded graphical objects displayed in the corresponding background images of the selectable virtual locations to a branded graphical object for presentation in the conference user interface during the conference by combining the selected advertisement data with the unbranded graphical objects, wherein the branded graphical objects presented in the conference user interface comprises two or more different branded graphical objects presented to two or more corresponding participants in different selectable virtual locations based on a speaker identifier associated with the spoken words or a participant identifier associated with the shared content.

2. The computer system of claim 1, wherein the advertisers bid on the advertisement objects.

3. The computer system of claim 2, wherein the advertisers bid on the advertisement objects based on predefined keywords, product categories, or themes associated with the virtual location.

4. The computer system of claim 1, wherein the advertising platform comprises one or more of a cost-per-click (CPC) model, a cost-per-action (CPA) model, a cost-per-impression (CPM) model, and a cost-per-view (CPV) model.

5. The computer system of claim 1, wherein the advertising platform comprises a campaign manager module for receiving the advertisement data and associated bids from the advertisers.

6. The computer system of claim 1, wherein the advertisement objects comprise a product image.

7. The computer system of claim 1, wherein the advertisement objects are related to a predefined theme associated with the virtual location.

8. The computer system of claim 1, wherein the advertisement objects comprise one or more of display ad, a static graphical object, and a moving graphical object.

9. A method for providing advertisements in a conference user interface, the method comprising:
a conferencing system establishing a conference between a plurality of participants via a corresponding computing device connected to the conferencing system via a communication network;
presenting a conference user interface to the computing devices, the conference user interface displaying each of the participants as a unique participant object in one of a plurality of selectable virtual locations stored in a virtual location database, each of the selectable virtual locations specified by a different participant in the conference and comprising a corresponding background image with one or more displayed objects and one or more advertisement objects comprising an unbranded graphical object, the conference user interface comprising a conferencing application for sharing content;
a speech/content recognition module determining keywords in response to words spoken by the participants or the shared content presented in the conferencing application;
an online advertising platform selecting, based on the keywords determined in response to the spoken words or the shared content presented in the conferencing application, advertisement data from one or more advertisers to be displayed in association with the advertisement objects displayed in the corresponding virtual locations;
providing the selected advertisement data to the conferencing system; and
in response to the selected advertisement data, the conferencing system automatically modifying without user input the unbranded graphical objects displayed in the corresponding background images of the selectable virtual locations to a branded graphical object for presentation in the conference user interface during the conference by combining the selected advertisement data with the unbranded graphical object, wherein the branded graphical objects presented in the conference user interface comprises two or more different branded graphical objects presented to two or more corresponding participants in different selectable virtual locations based on a speaker identifier associated with the spoken words or a participant identifier associated with the shared content.

10. The method of claim 9, wherein the online advertising platform selecting the advertisement data comprises selecting a winning bid.

11. The method of claim 9, wherein the advertisement data from one or more advertisers is based on predefined keywords, product categories, or themes associated with the virtual location.

12. The method of claim 9, wherein the online advertising platform comprises one or more of a cost-per-click (CPC) model, a cost-per-action (CPA) model, a cost-per-impression (CPM) model, and a cost-per-view (CPV) model.

13. The method of claim 9, further comprising the online advertising platform receiving the advertisement data and associated bids from the advertisers.

14. The method of claim 9, wherein the advertisement objects comprise a product image.

15. The method of claim 9, wherein the advertisement objects are related to a predefined theme associated with the virtual location.

16. A computer program embodied in a non-transitory computer-readable medium for execution by a processor, the computer program comprising logic configured to:

present a conference user interface to computing devices associated with one or more participants in a conference, the conference user interface displaying each of the participants as a unique participant object in one of a plurality of selectable virtual locations stored in a virtual location base, each of the selectable virtual locations specified by a different participant in the conference and comprising a corresponding background image with one or more displayed objects and one or more advertisement objects comprising an unbranded graphical object, the conferencing user interface comprising a conferencing application for sharing content;

determine keywords in response to words spoken by the participants or the shared content presented in the conferencing application;

select advertisement data, based on the keywords determined in response to the spoken words or the shared content presented in the conferencing application, from one or more advertisers to be displayed in associated with the advertisement objects displayed in the corresponding virtual locations; and automatically combining without user input the selected advertisement data with the unbranded graphical objects to define a branded graphical object for display in the corresponding background images of the selectable virtual locations in the conference user interface during the conference, wherein the branded graphical objects displayed in the conference user interface comprises two or more different branded graphical objects presented to two or more corresponding participants in different selectable virtual locations based on a speaker identifier associated with the spoken words or a participant identifier associated with the shared content.

17. The computer program of claim 16, wherein the logic configured to select the advertisement data comprises: logic configured to select a winning bid according to one or more of predefined keywords, product categories, and themes associated with the virtual location.

18. The computer program of claim 16, wherein the logic configured to select advertisement data is based on one or more of a cost-per-click (CPC) model, a cost-per-action (CPA) model, a cost-per-impression (CPM) model, and a cost-per-view (CPV) model.

\* \* \* \* \*